United States Patent [19]

Miksic et al.

[11] Patent Number: 5,597,514
[45] Date of Patent: Jan. 28, 1997

[54] CORROSION INHIBITOR FOR REDUCING CORROSION IN METALLIC CONCRETE REINFORCEMENTS

[75] Inventors: Boris A. Miksic, North Oaks; Christophe Chandler, Woodbury; Margarita Kharshan, Little Canada; Alla Furman, Shoreview; Barry Rudman, Woodbury; Larry Gelner, St. Paul, all of Minn.

[73] Assignee: Cortec Corporation, St. Paul, Minn.

[21] Appl. No.: 377,761

[22] Filed: Jan. 24, 1995

[51] Int. Cl.$^6$ ........................ C04B 103/61; C04B 111/26; C23F 11/12; C23F 11/14
[52] U.S. Cl. .................. 252/390; 422/7; 422/17; 422/16; 252/396; 252/394; 252/389.62; 252/387; 106/819; 106/810; 106/808; 106/728; 106/727; 106/713; 106/692; 106/690; 106/14.17; 106/14.16; 106/14.14; 106/14.13
[58] Field of Search ...................... 252/394, 396, 252/389.62, 387, 390; 422/7, 16, 17; 106/819, 713, 692, 690, 14.17, 14.16, 14.14, 14.42, 14.13, 14.44, 808, 810, 727, 728

[56] References Cited

U.S. PATENT DOCUMENTS

| | | |
|---|---|---|
| 2,941,953 | 6/1960 | Hatch . |
| 3,537,869 | 11/1970 | Proell ........................ 106/665 |
| 3,589,859 | 6/1971 | Foroulis ..................... 422/17 |
| 3,726,817 | 4/1973 | Niswonger ................. 428/447 |
| 3,748,159 | 7/1973 | George ....................... 106/717 |
| 3,751,387 | 8/1973 | Hall et al. .................. 252/478 |
| 3,789,051 | 1/1974 | Rees et al. .................. 524/432 |
| 3,852,213 | 12/1994 | Cooney . |
| 4,242,214 | 12/1980 | Lambert, Jr. ............... 252/75 |
| 4,315,889 | 2/1982 | McChesney et al. ......... 422/7 |
| 4,337,094 | 6/1982 | Tokar ......................... 106/725 |
| 4,391,645 | 7/1983 | Marcellis et al. ............ 106/809 |
| 4,402,847 | 9/1983 | Wilson et al. ............... 252/75 |
| 4,410,367 | 10/1983 | LaGrand .................... 106/284.06 |
| 4,512,915 | 4/1985 | Lumaret et al. . |
| 4,642,137 | 2/1987 | Heitzmann et al. ......... 106/607 |
| 4,662,942 | 5/1987 | Koga et al. ................. 524/75 |
| 4,693,829 | 9/1987 | Boffardi . |
| 4,746,367 | 5/1988 | Meyer ........................ 524/100 |
| 4,758,363 | 7/1988 | Sung et al. ................. 252/51.5 R |
| 4,759,864 | 7/1988 | Van Neste et al. ......... 252/75 |
| 4,975,219 | 12/1990 | Sato et al. . |
| 4,990,191 | 2/1991 | Schilling .................... 106/805 |
| 4,997,484 | 5/1991 | Gravitt et al. .............. 106/708 |
| 5,039,454 | 8/1991 | Policastro et al. .......... 252/610 |
| 5,104,562 | 4/1992 | Kardos et al. .............. 252/79 |
| 5,244,600 | 9/1993 | Cuisia et al. . |
| 5,326,529 | 7/1994 | Miksic et al. . |

OTHER PUBLICATIONS

EP 652305, May 10, 1995, Chemical Abstract 123:15551 only.
SU 1689329, Nov. 7, 1991, Chemical Abstract 122:10038 only.
JP 0149362 Sep. 14, 1982, Derwent Abstract 89637E/92 only.
Mater. Perform. (1983), 22 (6), 13–16, Chemical Abstract 99:93449 only.
CS 261986, May 15, 1989, Chemical Abstract 112:101304 only.
JP 56125259, Nov. 1, 1981, Chemical Abstract 96:56943 only.
JP 56125267 Oct. 1, 1981, Chemical Abstract 96:39853 only.
JP 54126229 Oct. 1, 1979, Chemical Abstract 92:63581 only.
JP 0149362 Sep. 14, 1982, Derwent Abstract 89637 E/92 only.
JP 54024937 Feb. 24, 1979, Chemical Abstract 91:8809 only.
JP 60067681 Apr. 18, 1985, Chemical Abstract 103:57548 only.

Primary Examiner—Richard D. Lovering
Assistant Examiner—Valerie D. Fee
Attorney, Agent, or Firm—Haugen and Nikolai, PA

[57] ABSTRACT

A corrosion inhibitor formulation for use in reinforced concrete structures, the inhibitor reducing the rate of corrosion in metallic reinforcing rods placed within the structures. The formulation comprises a mixture of benzoic acid, aldonic acid, and a triazole such as benzotriazole or tolyltriazole.

5 Claims, No Drawings

CORROSION INHIBITOR FOR REDUCING CORROSION IN METALLIC CONCRETE REINFORCEMENTS

BACKGROUND OF THE INVENTION

The present invention relates generally to corrosion inhibitors for use in reinforced concrete structures, and more particularly to corrosion inhibitors for reducing the rate of corrosion in metallic reinforcing rods placed within structures formed of concrete. The present inhibitor is designed for use in admixture with raw concrete, and hence is provided on an in-situ basis within the concrete mixing.

Concrete structures such as highways and bridges typically utilize metallic reinforcement members embedded therewithin to provide stability and additional strength to the concrete, and to enhance the ability of the concrete to withstand shear forces. These reinforcements are typically in the form of reinforcing rods, wire mesh, metallic fibers, and the like, and are usually situated in regular intervals within the cured concrete by pouring raw or uncured concrete therearound or, in the case of metallic fibers, added during the concrete mixing operation, for subsequent curing. The term "raw concrete" is utilized in a comprehensive sense, and is intended to relate to wet workable concrete mixtures which have not yet cured to their solid form. Upon the passage of time, the metallic reinforcements have a tendency to corrode as external elements such as moisture, atmospheric pollutants such as carbon dioxide, oxides of sulfur, oxides of nitrogen, hydrogen sulfide road treatment chemicals permeate through the concrete structure and reach the metal. When utilized in highways, bridges, and parking structures, chlorides including sodium chloride and calcium chloride may permeate the concrete structure due to the widespread utilization of such materials as a mechanism to melt ice and snow from the road surfaces. Both calcium chloride and sodium chloride are widely used for this purpose.

In order to facilitate the access of inhibitors to concrete reinforcements, including particularly the surfaces of concrete reinforcements, it is desirable that corrosion inhibitors be added to the raw concrete mixture in order to provide for contact with the surfaces of the metallic reinforcement members or structures. The corrosion inhibitor added in this fashion normally migrates at a rate sufficient to provide ongoing protection over relatively extended periods of time, and hence have an ability to protect the metallic reinforcements over such a period of time. It is, of course, always possible to boost the effectiveness of the inhibitor on a post-cure basis, provided the inhibitor can be placed within the body of the concrete.

In accordance with the present invention, a formulation has been developed which is readily adapted for use in admixture with raw or wet concrete mixtures, and which provides long-lasting and reliable corrosion inhibiting properties for metallic reinforcements. The formulation of the present invention facilitates the inhibition of corrosion while, at the same time, not adversely impacting or affecting the curing rate or ultimate strength of the concrete in which it is added.

Therefore, it is a primary object of the present invention to provide an improved in-situ corrosion inhibitor designed for admixture with raw or wet concrete mixtures, in which metallic reinforcements are placed.

It is a further object of the present invention to provide an improved formulation for use in admixture with raw or wet concrete mixtures wherein the formulation provides protection for the metallic reinforcements without adversely affecting the curing rate or ultimate strength of the concrete.

Other and further objects of the present invention will become apparent to those skilled in the art upon a study of the following specification and appended claims.

SUMMARY OF THE INVENTION

By way of summary, the present invention utilizes a mixture which is designed for use in admixture with raw or wet concrete, and wherein the formulation for the mixture employs a corrosion inhibitor having the formula:

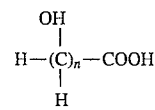

where "n" is an integer having a value of 6 or 7 including its water soluble salts, in an amount sufficient to hinder corrosion, and water soluble salts of benzoic or substituted benzoic acid, together with an amount of benzotriazole and/or tolyltriazole, and/or their water soluble salts, the triazole compounds being optionally included for certain applications. While the incorporation of certain glucose substances in concrete may retard the rate of curing, their concentration level of the formulations of the present invention is sufficiently low so that no adverse affects occur upon curing.

Typically, the mixtures of the present invention comprise a mixture of water soluble salts of benzoic or substituted benzoic acid in an amount ranging from 8% to 12%, an aldonic acid having the formula:

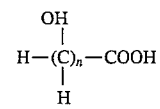

where "n" is an integer having a value of 6 or 7 including its water soluble salts, in an amount effective to hinder corrosion in an amount ranging from between 34% and 36%, water in an amount ranging from between 52% and 58%, and up to 1% of a triazole selected from the group consisting of tolyltriazole, benzotriazole, and their water soluble salts. The term "water soluble salts" in connection with aldonic acid and the listed triazoles typically include sodium, potassium, and ammonium derivatives. Benzotriazole, for example, forms stable metallic salts which are water soluble. These triazole compounds are particularly desirable when copper or copper alloys are embedded or otherwise in contact with the cured concrete. In accordance with the present invention, it has been found that the formulation of the present invention is provided in admixture to the raw concrete in an amount ranging from between 8 ounces and ounces per cubic yard of wet concrete. This typically ranges from between 16 ounces and 40 ounces. The corrosion inhibiting mixture of the present invention is typically added during mixing and blending of the raw concrete, and may be undertaken without difficulty during virtually any point in the mixing process, the only requirement being, of course, that the inhibitor becomes reasonably uniformly blended prior to pouring.

DETAILED DESCRIPTION OF THE PREFERRED EMBODIMENT

In accordance with the preferred embodiment of the present invention, a corrosion inhibitor for reducing corrosion in reinforcement materials within concrete consists of a mixture having the following general formulation:

| Component | Percentage by Weight |
| --- | --- |
| Water soluble salts of benzoic and substituted benzoic acid | 8%–12% |
| Aldonic acid or its water soluble salts | 34%–36% |
| Water | 52%–58% |
| Benzotriazole, tolyltriazole including their water soluble salts | up to 1%. |

In admixture, the selected formulation is mixed within raw concrete in an amount ranging from between about 8 ounces and 48 ounces per cubic yard of raw concrete. The present invention may be practiced in accordance with the following preferred examples.

EXAMPLE I

A corrosion inhibiting mixture was prepared in accordance with the following formulation:

| Component | Percentage by Weight |
| --- | --- |
| Ammonium benzoate | 10% |
| Sodium glucoheptonate | 35% |
| Water | 55% |
| Benzotriazole | trace, less than 1%. |

This formulation was provided in admixture with concrete in an amount of 8 ounces by weight per cubic yard of concrete for inhibiting the corrosion of metallic reinforcements.

EXAMPLE II

A corrosion inhibiting mixture was prepared in accordance with the following formulation:

| Component | Percentage by Weight |
| --- | --- |
| Ammonium benzoate | 8% |
| Sodium glucoheptonate | 36% |
| Water | 56% |
| Benzotriazole | trace, less than 1%. |

This formulation was provided in admixture with concrete in an amount of 16 ounces per cubic yard raw concrete for inhibiting the corrosion of metallic reinforcements.

EXAMPLE III

A corrosion inhibiting mixture was prepared in accordance with the following formulation:

| Component | Percentage by Weight |
| --- | --- |
| Ammonium benzoate | 12% |
| Sodium glucoheptonate | 34% |
| Water | 53% |
| Benzotriazole | 1%. |

This formulation was provided in admixture with concrete in an amount of 32 ounces per cubic yard of raw concrete for inhibiting the corrosion of metallic reinforcements.

EXAMPLE IV

A corrosion inhibiting mixture was prepared in accordance with the following formulation:

| Component | Percentage by Weight |
| --- | --- |
| Ammonium benzoate | 9% |
| Sodium glucoheptonate | 35% |
| Water | 55% |
| Benzotriazole | 1%. |

This formulation was provided in admixture with concrete in an amount of 48 ounces per cubic yard of raw concrete for inhibiting the corrosion of metallic reinforcements.

GENERAL DISCUSSION

As has been indicated, the utilization of the formulations based upon mixtures in accordance with the present invention enhance the lifetime of metallic reinforcements so as to preserve the integrity of concrete structures, particularly highways, bridges and automobile parking facilities. The widespread utilization of chloride-containing salts such as sodium chloride and calcium chloride, while necessary for safety purposes, have been detrimental to the integrity of reinforced concrete structures. Automobiles carry certain residual amounts of these chloride-containing materials onto areas which are not normally exposed, but which nevertheless are adversely affected by relatively rapid deterioration of the metallic reinforcements.

Reinforced concrete structures are typically provided with steel bars and/or rods for longitudinal tension reinforcement as well as compression reinforcement, and reinforcement against diagonal tension. Expanded metal, steel-wire mesh, hoop iron or other thin rods may be embedded in the concrete structure for reinforcement purposes. Being ferrous-based materials, and as indicated hereinabove, the integrity of the reinforcement is subject to deterioration whenever exposure to chloride-containing salts, oxides of sulfur or nitrogen are encountered. When mixtures containing the formulations of the present invention are utilized in the concrete on an in-situ basis, significant protection of the reinforcement is obtained.

To enhance mixing of the formulation of the present invention with wet or raw concrete, it is sometimes desirable to blend the formulation with an inert carrier in order to enhance the dispersion of the formulation within the wet concrete. Inert carriers for blending into wet concrete are, of course, well known, with silica powder being one of many examples.

It will be appreciated that various modifications may be made in the present invention, and that the formulations provided hereinabove are deemed representative only and are not to be deemed limiting for the true spirit and scope of the invention.

What is claimed is:

1. A corrosion inhibitor for reducing corrosion of metallic reinforcement embedded in situ within poured concrete structures comprising a mixture of the following formulation:

(a) a benzoic acid component selected from the group consisting of water soluble salts of benzoic acid and benzoic acid in the range of from between about 8% to 12% by weight;

(b) an aldonic acid component selected from the group consisting of aldonic acid and its water soluble salts in the range of from between about 34% to 36% by weight;

(c) water in the range of from between about 52% to 58%;

(d) a triazole selected from the group consisting of benzotriazole, tolyltriazole and their water soluble salts in the range of up to 1% by weight; and (e) wherein the formulation is provided in an admixture with raw concrete prior to pouring and curing in an amount ranging from between about 8 ounces and 48 ounces per cubic yard of raw cement.

2. The formulation of claim 1 wherein the admixture is in an amount of 16 ounces per cubic yard of raw concrete.

3. The formulation of claim 1 wherein the triazole component is present in an amount of 0.5%.

4. A corrosion inhibitor for reducing corrosion of metallic reinforcement embedded in situ within poured concrete structures comprising a mixture of the following formulation:

(a) a benzoic acid component selected from the group consisting of water soluble salts of benzoic acid and benzoic acid in an amount of 10% by weight;

(b) an aldonic acid component selected from the group consisting of aldonic acid and its water soluble salts in an amount of 35% by weight;

(c) water in an amount of 55% by weight;

(d) a triazole selected from the group consisting of benzotriazole, tolyltriazole and their water soluble salts in the range of up to 1% by weight; and (e) wherein the formulation is provided in an admixture with raw concrete prior to pouring and curing in an amount ranging from between about 6 ounces and 10 ounces per cubic yard of raw concrete.

5. The method of inhibiting the corrosion of metallic reinforcements embedded in situ within poured concrete structures which comprises providing, in admixture with raw concrete prior to pouring and curing of the raw concrete, a compound of the following formulation:

(a) a benzoic acid component selected from the group consisting of water soluble salts of benzoic acid and benzoic acid in the range of from between about 8% to 12% by weight;

(b) an aldonic acid component selected from the group consisting of aldonic acid and its water soluble salts in the range of from between about 34% to 36% by weight;

(c) water in the range of from between about 52% to 58%;

(d) a triazole selected from the group consisting of benzotriazole, tolyltriazole and their water soluble salts in the range of up to 1% by weight; and (e) with the formulation being present in the raw concrete prior to pouring in an amount ranging from between about 8 ounces and 48 ounces per cubic yard of said raw concrete.

* * * * *